UNITED STATES PATENT OFFICE.

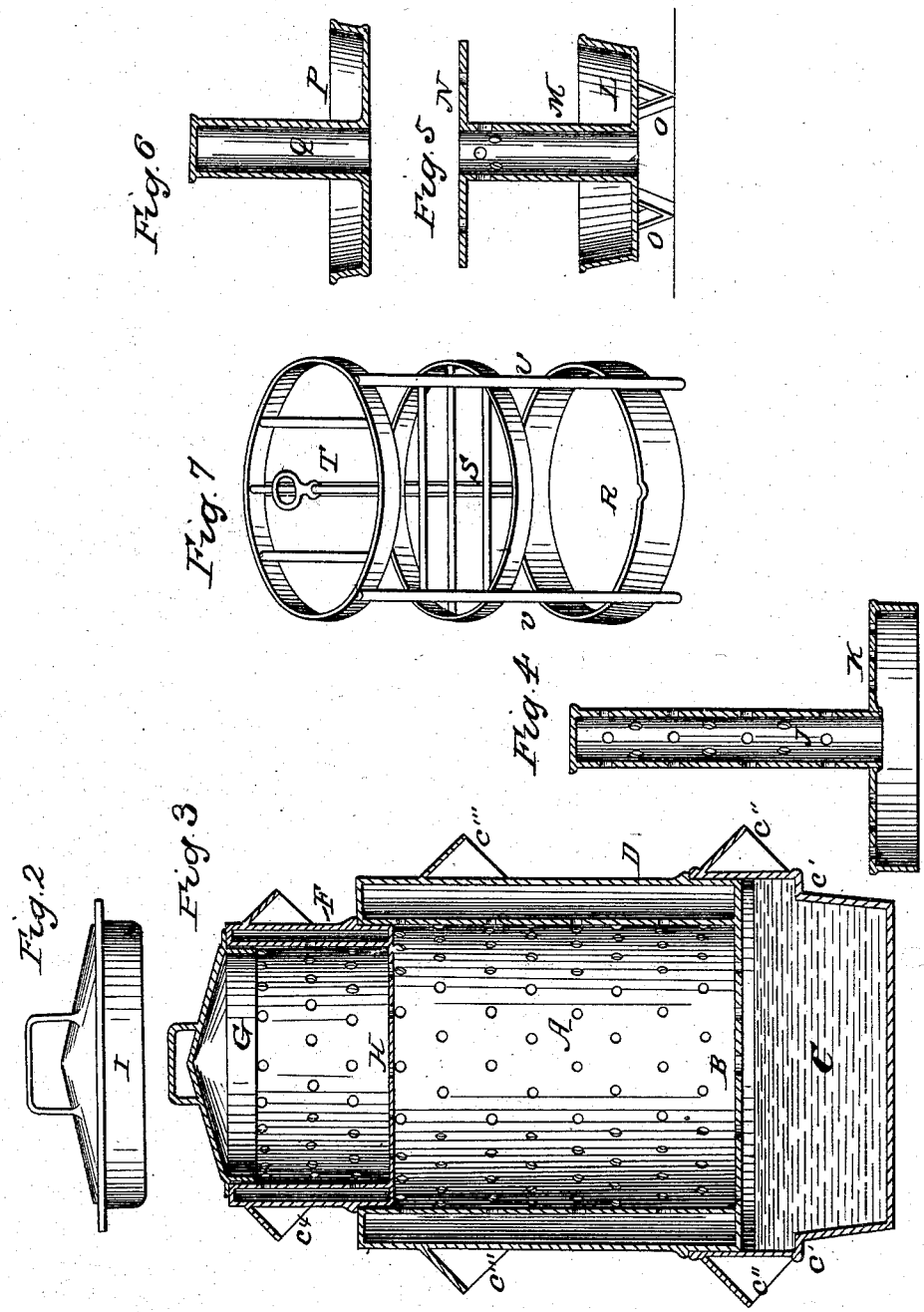

JOHN ZIMMERMAN, OF ROYALTON, NEW YORK.

COOKING APPARATUS.

Specification forming part of Letters Patent No. 47,675, dated May 9, 1865.

*To all whom it may concern:*

Be it known that I, JOHN ZIMMERMAN, of Royalton, in the county of Niagara and State of New York, have made certain new and useful Improvements in Cooking Apparatus; and I do hereby declare the following to be a full, clear, and exact description of the nature, construction, and operation of the same, reference being had to the annexed drawings, making part of this specification, in which—

Figure 1 shows by vertical central section the main part of the apparatus. Fig. 2 is the lid to the same, which takes the place of Fig. 3, when the latter, which is an additional steamer, is removed. Figs. 4, 5, and 6 are utensils for various uses in connection with the main portion of the apparatus. Fig. 7 is a frame-work to occupy the central portion of the main receptacle, and its use will be explained.

The use of the portions Figs. 3, 4, 5, 6, and 7 is optional. The other portions, consisting of the chamber and the water-bath below it, constitute the main portion of my invention, which consists of a central chamber, encircled by a perforated plate having a perforated bottom, through which the steam is admitted to the viands in the chamber, the whole being surmounted by a lid and surrounded by an exterior casing.

It also consists in providing a chamber thus constructed with a set of utensils, characteristically made in relation thereto.

To enable others skilled in the art to which my invention relates to fully understand and use the same, I will proceed to describe its construction and operation.

A is a perforated metallic cylinder which surrounds a cylindrical space when the viands are cooked. It has a perforated floor, B, and a lid, I, Fig. 2, when the upper end is not occupied by the supplementary cooking-chamber E, Fig. 3. The central chamber is surrounded by an annular space bounded by the exterior casing, D, and that part of the apparatus rests upon and partially within the water-pan C, which in turn rests upon the top of a stove or furnace, being supported by the shoulder C', while the bottom projects downwardly into the fire-box or furnace, as the case may be.

The superior incumbent vessel E, with a perforated inner wall, a tight outer wall, F, a perforated bottom, H, and a lid, G, is supplementary to the lower vessel and of similar character thereto, and the lids G I are made hallow, so that the included air may act as a non-conductor and reduce the radiation of heat. The handles $C^2$ $C^3$ $C^4$ are shown as flanges or sheet-metal straps for handling the portions of the apparatus to which they are attached.

Fig. 4 shows a false bottom, K, and central perforated stem, J, upon and around which the edibles are placed, when the device, Fig. 4, is lowered into the receptacle A.

Fig. 5 shows a pan, L, with legs $o$ to occupy said chamber upon occasion. It has also a central perforated tube, M, for the circulation of steam and an upper plate, N, which may support a pan, P, Fig. 6. These pans may contain such provisions as are deemed suitable, but are especially adapted to such as require a tight vessel, puddings and the like, while the stand, Fig. 7, when in place in the apparatus, is adapted to support upon the grating S a joint of meat, fish, or other comestibles, while the gravy is caught by the dripping-pan R, which, together with the rack S and T, is supported by the vertical rods U.

I believe I have sufficiently described my invention so that one skilled in the branch of industry to which it appertains would be able from it, in connection with the drawings, to construct my invention, and I remark that the purpose is to so construct the apparatus that the steam rising from the water in chamber C will permeate all parts, while the victuals are conveniently placed for withdrawal, and, if necessary, are kept separate and distinct.

Having thus described the nature, construction, and operation of my invention, what I claim therein as new, and desire to secure by Letters Patent, is—

1. The combination of the inner perforated receptacle with the exterior shell or casing and the boiler, substantially as described.

2. The general arrangement of the containing vessel, consisting of the perforated receptacle and its outer casing, and the cooking-utensils, as described and represented, adapted for special and characteristic purposes therein.

To the above specification of my improved cooking apparatus I have signed my hand this 9th day of February, 1865.

JOHN ZIMMERMAN.

Witnesses:
ALEXR. A. C. KLAUCKE,
EDWARD H. KNIGHT.